US006931600B1

(12) United States Patent
Pittman

(10) Patent No.: US 6,931,600 B1
(45) Date of Patent: Aug. 16, 2005

(54) INTEGRATING INTO AN APPLICATION OBJECTS THAT ARE PROVIDED OVER A NETWORK

(75) Inventor: Michael E. Pittman, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/479,606

(22) Filed: Jan. 6, 2000

Related U.S. Application Data

(60) Provisional application No. 60/154,166, filed on Sep. 15, 1999, provisional application No. 60/147,872, filed on Aug. 9, 1999, and provisional application No. 60/133,228, filed on May 7, 1999.

(51) Int. Cl.[7] .............................................. G09G 5/00
(52) U.S. Cl. ....................... 715/767; 715/749; 715/748
(58) Field of Search ................................ 345/838, 781, 345/854, 861, 835, 803, 760, 749, 748, 767

(56) References Cited

U.S. PATENT DOCUMENTS

| | | | | |
|---|---|---|---|---|
| 5,815,154 | A | | 9/1998 | Hirschtick et al. .......... 345/356 |
| 5,894,310 | A | | 4/1999 | Arsenault et al. |
| 5,926,179 | A | * | 7/1999 | Matsuda et al. ............ 345/419 |
| 5,973,687 | A | * | 10/1999 | Foley et al. ................ 345/866 |
| 6,097,389 | A | * | 8/2000 | Morris et al. ............... 345/804 |
| 6,297,824 | B1 | * | 10/2001 | Hearst et al. ............... 345/848 |
| 6,331,858 | B2 | * | 12/2001 | Fisher ........................ 345/582 |
| 6,362,817 | B1 | * | 3/2002 | Powers et al. .............. 345/419 |
| 6,417,869 | B1 | * | 7/2002 | Do .............................. 345/718 |

FOREIGN PATENT DOCUMENTS

| | | | |
|---|---|---|---|
| EP | 0 895 195 A1 | 2/1999 | ........... G06T/17/40 |
| WO | WO 98/33127 | 7/1998 | ........... G06F/17/21 |

OTHER PUBLICATIONS

Mark R. Brown, Using Netscape 2, Que, ©1995, pp. 729–786, and 817–840.*
Nousch M et al., "CAD on the World Wide Web: virtual assembly of furniture with Beaver", Proceedings VRML 99, Fourth Symposium on The Virtual Reality Modeling Language 1999, Paderborn, Germany, Feb. 23–26, 1999, pp. 113–119, XP 002172203.
Regli, William C., "Internet–Enabled Computer–Aided Design", IEEE Internet Computing, Jan.–Feb. 1997, IEEE, USA, vol. 1, No. 1, pp. 39–50, XP 002172204.
EP 02 01 6764 European Search Report.

* cited by examiner

Primary Examiner—Kristine Kincaid
(74) Attorney, Agent, or Firm—Moser, Patterson & Sheridan, LLP

(57) ABSTRACT

A mechanism is provided for integrating into a scene at a client an object that is defined by a set of data. The scene is displayed in a first display region of a display device. A selectable item is displayed in a second display region of the display device. The selectable item corresponds to the object but is generated based on less data than the set of data defining the object. User input is received that selects the selectable item displayed within the second display region for incorporation into the scene. In response to receiving the user input, the set of data is retrieved and the object is generated on the client based on the set of data and displayed within the scene in the first display region of the display device.

30 Claims, 10 Drawing Sheets

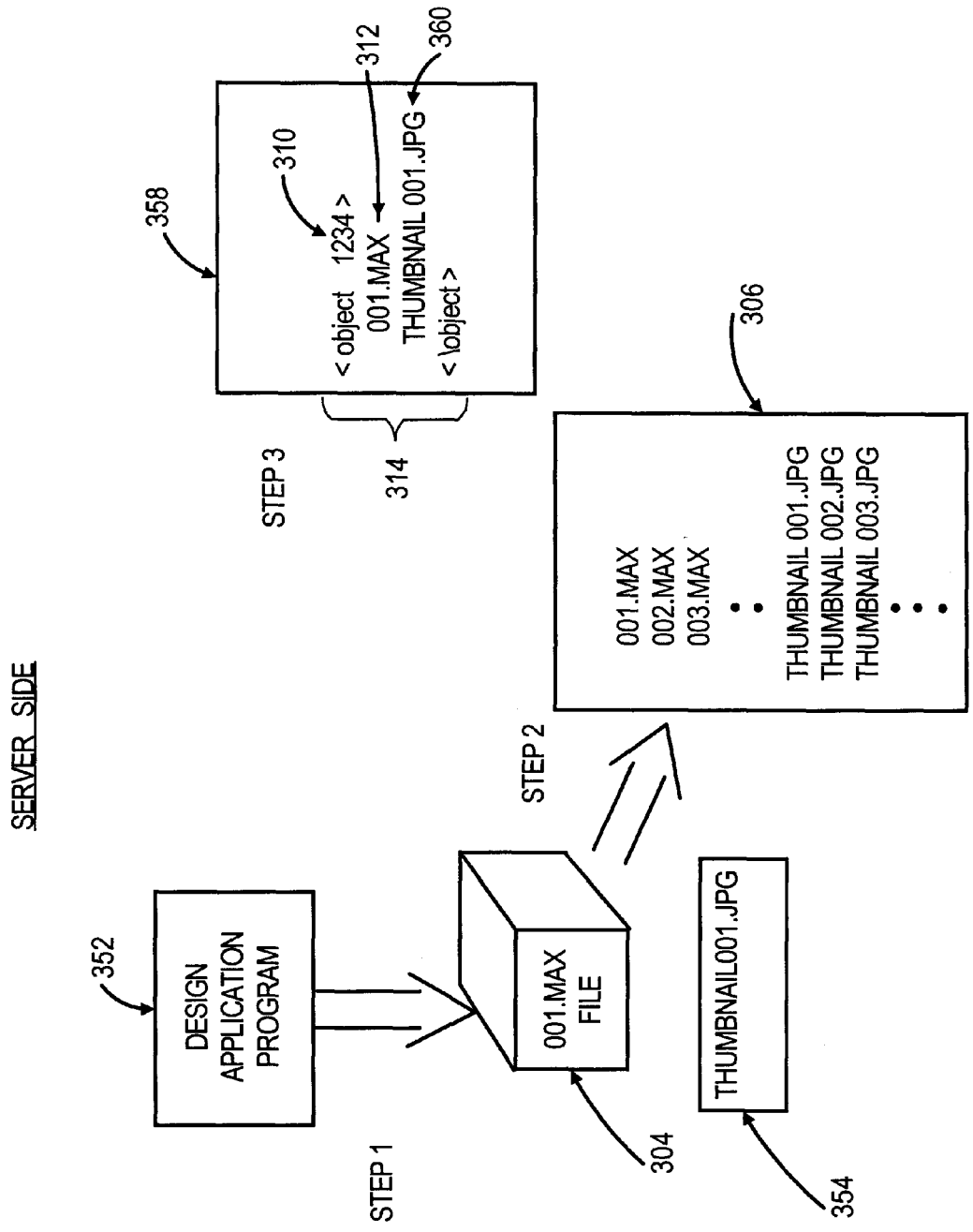

INTEGRATING INTO AN APPLICATION OBJECTS THAT ARE PROVIDED OVER A NETWORK

This patent application claims priority from:

U.S. Provisional Patent Application No. 60/133,228, filed on May 7, 1999, entitled METHOD AND SYSTEM FOR INTEGRATING OBJECTS INTO AN APPLICATION THAT ARE PROVIDED OVER A NETWORK, U.S. Provisional Patent Application No. 60/147,872, filed on Aug. 9, 1999, entitled INTEGRATING OBJECTS INTO AN APPLICATION THAT ARE PROVIDED OVER A NETWORK, and U.S. Provisional Patent Application No. 60/154,166, filed on Sep. 15, 1999, entitled MULTIMEDIA TOOL FOR MODELING AND DESIGNING 3D OBJECTS the content of which are hereby incorporated by reference in their entirety.

FIELD OF THE INVENTION

The present invention relates to computer software and, more specifically, to integrating content that is provided over a network into a scene.

BACKGROUND OF THE INVENTION

Computer hardware and computer software programs have revolutionized the way we work, shop, and do business. In general, computers have increased our productivity by providing a mechanism that allows us to do more in less time. For example, many labor and time intensive tasks of the past, such as ledge bookkeeping and mathematical problem-solving are now performed in a number of minutes using a variety of accounting and statistical computer programs. In addition, computers have also enhanced the productivity of both architects and engineering designers. Today, few architecture schematics are created at a drafting table with pencils, drafting paper, and rulers. Instead, three-dimensional architecture and landscape designs are typically conceptualized and modeled through the use of computer software programs.

For example, various types of architecture design programs, such as 3D Studio VIZ™, which is commercially available from Autodesk, Inc., can be used to perform visual rendering application functions, such as the modeling and rendering of 3D objects. Examples of how a design program may be used to generate and render different objects is described in detail in patent application Ser. No. 09/286,133, filed Apr. 1, 1999, entitled TRANSLATING OBJECTS BETWEEN SOFTWARE APPLICATIONS WHICH EMPLOY DIFFERENT DATA FORMATS and in patent application Ser. No. 09/240,070, filed Jan. 29, 1999, entitled METHOD AND SYSTEM FOR DETERMINING THE SPACING OF OBJECTS, the contents of which are hereby incorporated by reference in their entirety. Additionally, a detailed description as to the use of 3D Studio VIZ™ is provided in the "3D Studio VIZ™ R2" User's Guide available through Autodesk, Inc.

Design programs provide a mechanism that allows users to conceptualize and generate design layouts. By simulating the layout of a particular design, a user can quickly visualize how a particular object or combination of objects will look. In many cases, by simulating a design layout, a significant cost reduction may be realized as mistakes can be identified and corrected prior to the construction or manufacture of a particular design.

To aid the users, certain design programs include a pool of predefined "content" that can be included within a design layout ("scene"). As used herein, the term content is broadly defined so as to include a graphical description of any type of object or object attribute that may be included within a design layout.

For example, a predefined pool of content may include but is not limited to such objects as light fixtures, doors, chairs, walls, plants and any other object types that may be needed to generate a particular scene. In addition, the predefined pool of content may also include a variety of object attributes that may be applied to the different objects that are included with a scene. For example, the predefined pool of content may include a variety of textures, patterns, colors or bump maps that may be applied to the different objects that are contained within a scene. By substituting the different objects and object attributes within a scene, a user can determine what the type of objects and the type of object attributes that are most appealing for a particular project.

For example, a design program may include a pool of "light" objects that depict several types of light fixtures from several different manufactures. By comparing how the different light combinations look within the design layout, the user can conveniently determine which light fixtures should be purchased for the particular project.

In a similar manner, a design program may include a pool of "chair" objects that depict several different types of chairs that are produced by different manufactures. Again, by comparing the different chair objects within a scene, the user can identify which chairs are most appropriate for the particular project. Further, by applying different attributes to the different chair objects (i.e. different fabric materials, colors and textures) the user can conveniently determine which attributes are most appealing for each of the different objects.

By including a pool of predefined content (i.e. predefined objects and object attributes) within a design program, a user is provided with a mechanism that will allow them to visually compare and contrast the different products that may be of interest to them for their particular project. Additionally, including a pool of predefined objects provides a marketing tool that allows a manufacturer to promote their product as users of the design program can visually picture how the manufacturer's products would look within their particular project.

To provide users with a pool of predefined content, many design programs include one or more CD-ROMs or floppy disks ("transport media") that contain a static pool of predefined content that may be included within a scene. However, a drawback with providing users with a static pool of predefined content is that manufacturers are continually generating new content that users of a design program may want to include within their scenes. For example, manufactures are constantly developing new products such as furniture, lighting fixtures, flooring material, and appliances that a user may wish to include within a scene. However, because the user is limited to the static pool of predefined content that is included on the transport media, users are not able to take advantage of the new products that are constantly being created.

One method of trying to provide users with the most recent available content is by continually supplying the users with new transport media that includes updated pools of predefined content. For example, as new products are developed, content representing the new products can be stored on transport media and shipped to the users of the design program. However, a drawback with this solution is that a significant amount of resources will be required to continually provide the users with new transport media. These additional resources will induce extra costs that will need to be incurred by either the producer of the design program or the end users.

In addition, because the act of (1) creating the content that represents the manufactures product; (2) storing the content on the transport media; and (3) shipping the transport media to the individual users typically takes a significant amount of time, users will generally experience a long delay between the time a manufacture creates a new product and the time that the predefined content representing that new product will be available for use within a design layout.

Another drawback with the typical method of providing users with predefined content is that the user has no idea what the actual object is going to look like until it is actually brought into the design layout. For example, a typical transport media may contain a pool of predefined chair objects that may be integrated into a design layout. In general, the pool of predefined chair objects will consist of a group of files having a particular format that can be used to graphically define the chair objects. For example, the transport media may contain the following group files: char001.MAX; char002.MAX; char003.MAX; char004.MAX; char005.MAX; char006.MAX; char007.MAX; char008.MAX; char009.MAX. However, a drawback with this conventional method of providing content is that the list of files provide little information as to what each chair object will actually look like when inserted into a design layout. Thus, to determine what a particular chair object will look like, the user is forced to download its corresponding file into the design program and to integrate the object into the design layout.

Based on the foregoing, it is highly desirable to provide a mechanism that can reduce the amount of resources and cost that is typically required in providing users with access to predefined content that is based on newly manufactured products.

It is also desirable to provide a mechanism that can reduce the amount of time that typically occurs between when a new product is developed by a manufacturer and when predefined content representing the new product becomes available to users of a design program.

It is further desirable to provide a mechanism that can provide a user with a clearer description of what an object looks like without having to actually integrate the object into their design layout.

SUMMARY OF THE INVENTION

The present invention comprises, in one aspect, a method for integrating an object into a scene at a client, wherein the object is defined by a set of data. The method comprises performing at the client the steps of displaying the scene in a first display region of a display device; displaying a selectable item in a second display region of the display device, wherein the selectable item corresponds to the object but is generated based on less data than the set of data; receiving user input that selects the selectable item displayed within the second display region for incorporation into the scene; and in response to receiving the user input, performing the steps of retrieving the set of data, generating the object on the client based on the set of data, and displaying the object in the scene in the first display region of the display device.

According to another aspect, a method is provided for applying attributes to an object. The method comprises performing at the client the steps of displaying the object within a first display region of a display device of the client; retrieving over a network into a second display region of the display device a displayable item associated with a visible attribute; receiving user input that selects the displayable item displayed within the second display region and the object displayed in the first display region; and in response to receiving the user input, modifying the object to reflect the visual attribute associated with the displayable item.

According to another aspect, a method is provided for managing at a client, an object that is defined by a set of data that is maintained at a remote location from the client. The method comprises performing at the client the steps of storing a selectable item at the client, wherein the selectable item is a smart object that includes both graphical image information of the object and address information that indicates the remote location of the set of data; receiving user input that selects the selectable item stored at the client; and in response to receiving the user input, performing the steps of retrieving the set of data from the remote location, and generating the object on the client based on the set of data.

The invention also encompasses a computer-readable medium and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3B illustrates a sequence of steps for including both a thumbnail image and geometrical object within an HTML document;

DETAILED DESCRIPTION OF THE PREFERRED EMBODIMENT

Figure 1:
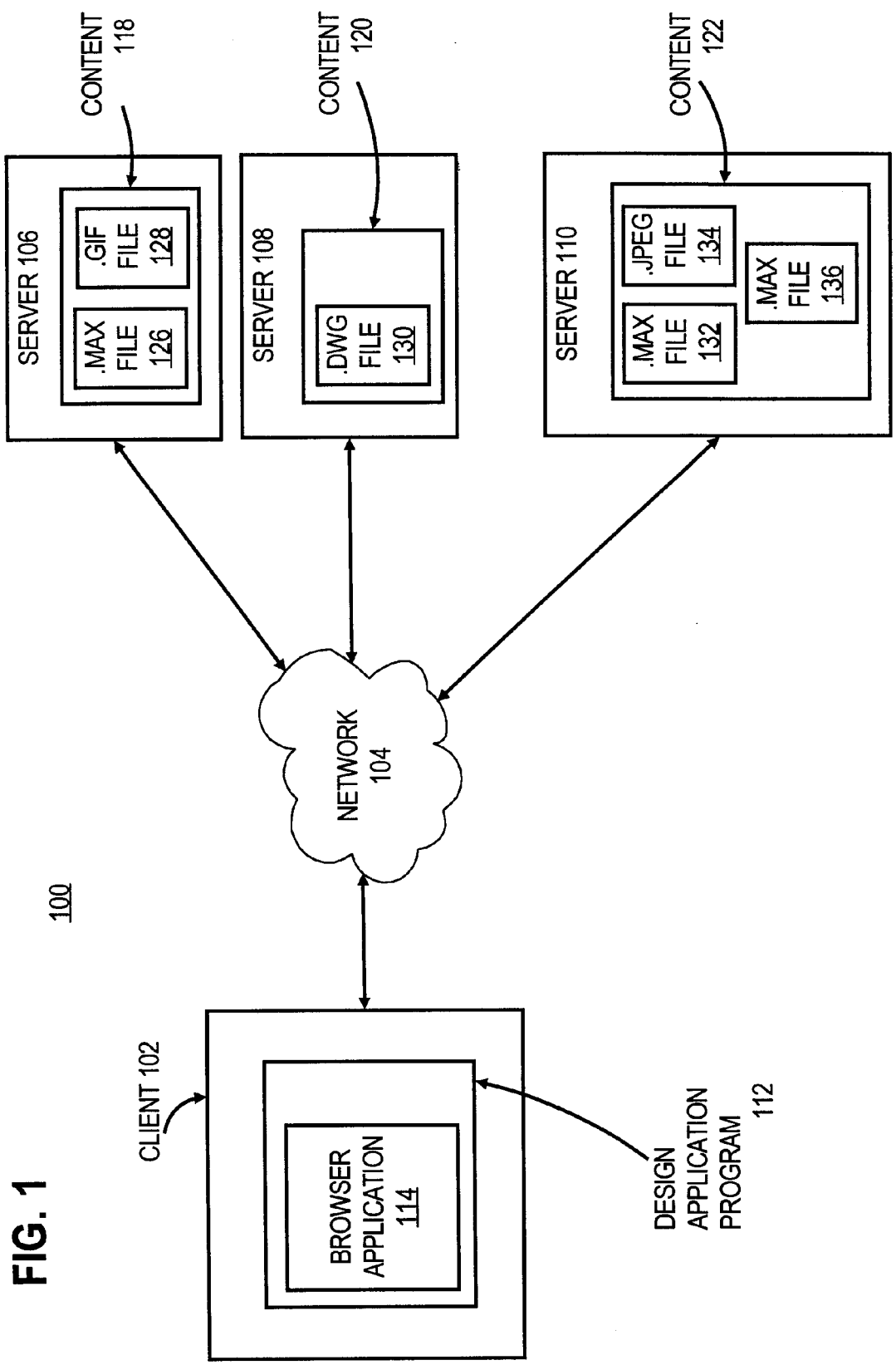
FIG. 1 is a block diagram of a system in which certain embodiments of the invention may be used.

A method and apparatus for translating objects between software applications that employ different data formats is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

Information that a client may retrieve from a server is generally referred to herein generically as "content". According to one aspect of the invention, the content provided by servers includes content that can be transferred directly from the client-side program used to display the content (e.g. a browser) into a scene within a graphic design application. Downloadable content that can be integrated in this manner is referred to herein as "assets". Assets may be, for example, the geometric information that define three dimensional objects that can be integrated into scenes constructed by a user. Assets may also be raster images that correspond to object attributes, such as color or texture.

According to one embodiment, a client-side asset integration mechanism is provided for managing and organizing assets, and for integrating those assets into scenes within graphic design applications. In one embodiment, the asset integration mechanism embeds Web technology into the graphic design applications, which allow users of those applications to browse the content (including assets) located on servers that are connected to the client through the network system ("remote servers"). In certain embodiments, a client issues a browser request for content associated with a remote server. The content received from the remote server is in the form of an HTML document that includes links to one or more assets. In response to encountering such links, the asset integration mechanism automatically generates and displays thumbnail images of those assets within the HTML document displayed at the client. The user may then manipulate user interface controls to directly transfer the assets associated with those thumbnail images directly into a scene. Such manipulation may involve, for example, dragging selected thumbnail images from the browser directly into a scene.

An asset may be, for example, a file that includes geometrical information that defines a 3-dimensional object ("3D object"). A drawback with browsing a Web site that contains a 3D object is that a significant amount of time is typically required to retrieve the geometrical information to render the object within a window at the client. In one embodiment, when browsing an HTML document that references a 3D object, the asset integration mechanism retrieves only a portion or subset of the geometrical information. The asset integration mechanism then generates the thumbnail of the 3D object based on the retrieved subset of data and displays it within a window at the client. Once the thumbnail image is displayed, the user may integrate the object into an architecture design program by dragging and dropping the thumbnail image from the browser window into a scene that is being displayed at the client. In response to a user dragging and dropping the thumbnail image into a scene, the asset integration mechanism retrieves the complete geometrical information for the object to import the information into the design program. Thus, the asset integration mechanism allows users to view thumbnail pictures of 3D objects without having to download the complete geometrical information for that object.

FIG. 1 is a block diagram of a system 100 in which certain embodiments of the invention may be used. Generally, system 100 includes a client 102, one or more remote servers 106, 108, 110, and a network 104. Client 102 may be a device, such as a personal computer, workstation, or other like device that is capable of communicating with one or more remote servers 106, 108, 110 over network 104. As depicted, executing on client 102 is a design application program 112. In one embodiment, the design application program 112 is configured as an architecture design program, such as 3D Studio VIZ™, that can be used to perform visual rendering application functions, such as the modeling and rendering of 3D objects. Additionally, design application program 112 is also configured to include a browser application 114 that is capable of retrieving and displaying electronic document information that is received from servers 106, 108 and 110. Design application program 112 and browser application 114 may be statically or dynamically linked. Alternatively, design application program 112 and browser application 114 may represent separate applications that communicate through the use of sockets, shared memory or any other communication mechanism that allows information to be conveyed between separate applications.

In one embodiment, browser application 114 is an extended version of an off-the-self browser program, such as Microsoft Internet Explorer® or Netscape Navigator® that is configured to generate and display thumbnail images of object geometry that is associated with servers 106, 108 and 110. For example, in one embodiment browser application 114 is configured to include one or more plug-in type applications that extend the normal functions that are typically provided by an off-the-self browser program. In other embodiments, browser application 114 is a proprietary browser application that is configured to generate and display thumbnail images of object geometry that is associated with servers 106, 108 and 110. How thumbnail images are generated and displayed at the client is described in detail below.

Network 104 may be the global packet-switched network known as the Internet, a private Intranet for a particular company, or any combination thereof. The network 104 may form part of a LAN or WAN and may use a variety of different communication protocols.

The servers 106, 108, 110 are computers, or one or more hardware or software components or processes that cooperate or execute in one or more computer systems. The servers 106, 108, 110 are coupled to the network 104 and are configured to respond to message requests that are received from clients, such as client 102. As depicted, servers 106, 108, 110 respectively include content 118, 120 and 122 that is accessible by client 102 through network 104. The content may include, for example, items such as raster image files (bitmap files) or files that contain geometric information about a particular object or set of objects.

The bitmap files may be stored on the server using a variety of different formats that includes but is not limited to the JPEG, GIF, TIF, PCX, and any other file format that is native to, or may be supported by, a browser type application, that includes but not limited to Microsoft Internet Explorer® and Netscape Navigator®. Likewise, the geometry information may be stored on the server using a variety of different formats that includes, but is not limited to, the MAX, DWG, and another other file format that is, or may be supported by 3D Studio VIZ™ or any other plug-in or non-plug-in type architecture design program. Thus, embodiments of the invention are not limited to any particular type of file format or any particular type of browser application. In this example, content 118, 120 and 122 respectively include content files 126–128, 130, and 132–136.

In one embodiment, servers 106, 108, 100 are configured as Web servers that can communicate with client 102 using the HTTP protocol. In certain embodiments, servers 106, 108, 110 provide content 118, 120, 122 to client 102 through the use of HTML documents. For explanation purposes, contents 118, 120, 122 have been respectively shown to reside on servers 106, 108, 110. However, contents 118, 120, 122 may actually reside in memory that is outside each of the servers. For example, the content 118 may actually reside within a database or other computer system that is accessible but separate from server 106. How pages of content are created and presented to a client is described in detail below.

Generating Electronic Documents at Remote Servers

Figure 2A:
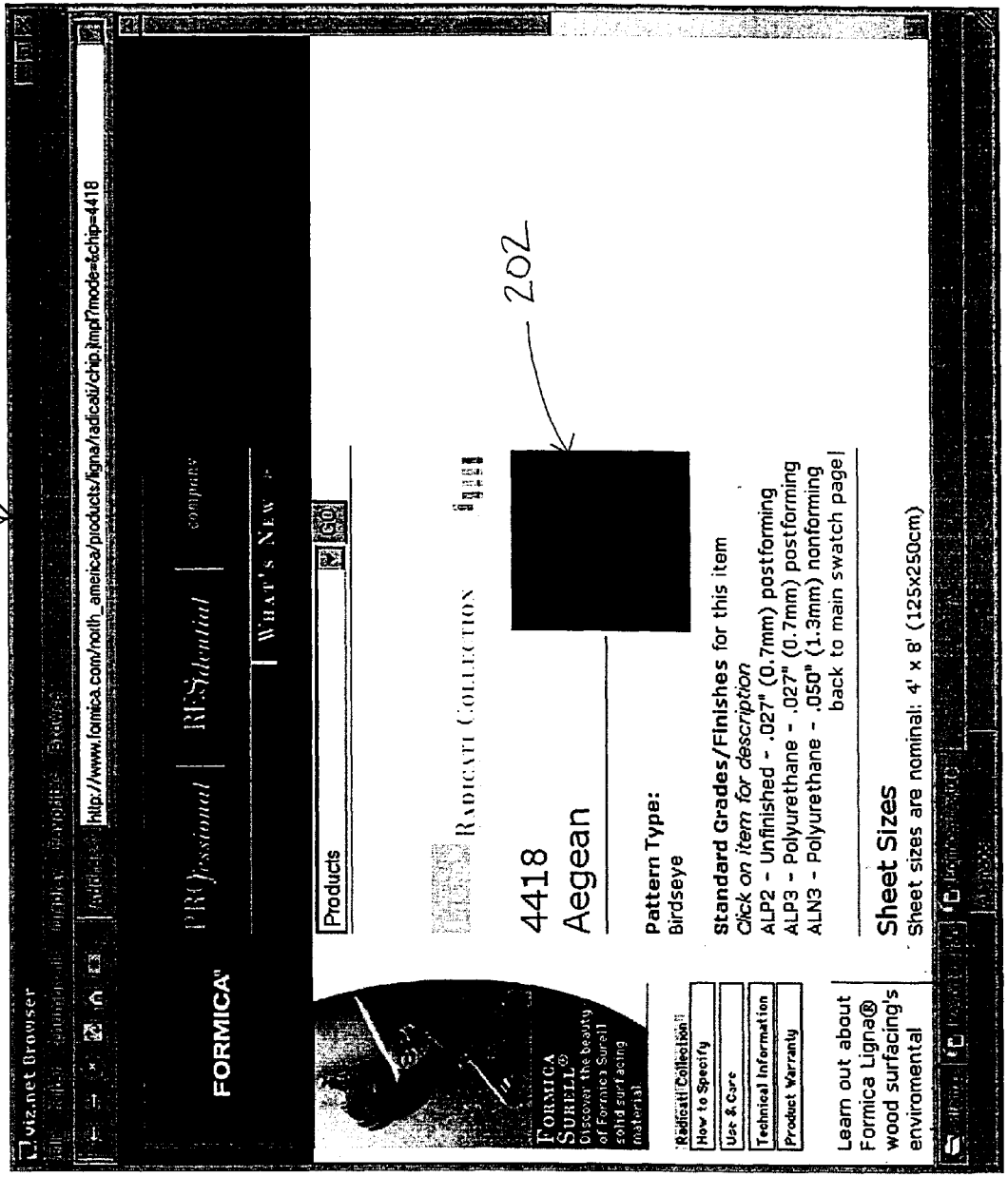
FIG. 2A illustrates an HTML document that includes content that may be integrated into the design application program.

A large number of companies have developed Web sites to promote and sell their product line. For many companies, it would be highly desirable to be able to include on their Web sites assets representing their products that could be downloaded by a user and included within a design layout. For example, FIG. 2A illustrates an HTML document 200 that includes a semiconductor chip 202 that is sold by Formica Corporation. In this example, an HTML document is maintained by a server (the "Formica server") that includes a reference to a file that contains raster image or bitmap information (i.e. a GIF, JPEG or other similar file type) that represents a particular product that is for sale. In general, to create a web page that displays a raster image, an HTML document is generated that includes a reference to the particular raster image file. For example, the HTML tag "<img src="/img/chip/radicati/chip-4418-medium.jpg">" may be included in an HTML document. When the Formica server sends the HTML document to a client, the client decodes the HTML tag by sending a separate request to the Formica server for the image file. When the client receives the image file from the Formica server, the client displays the image at the appropriate position within the web page.

Figure 2B:
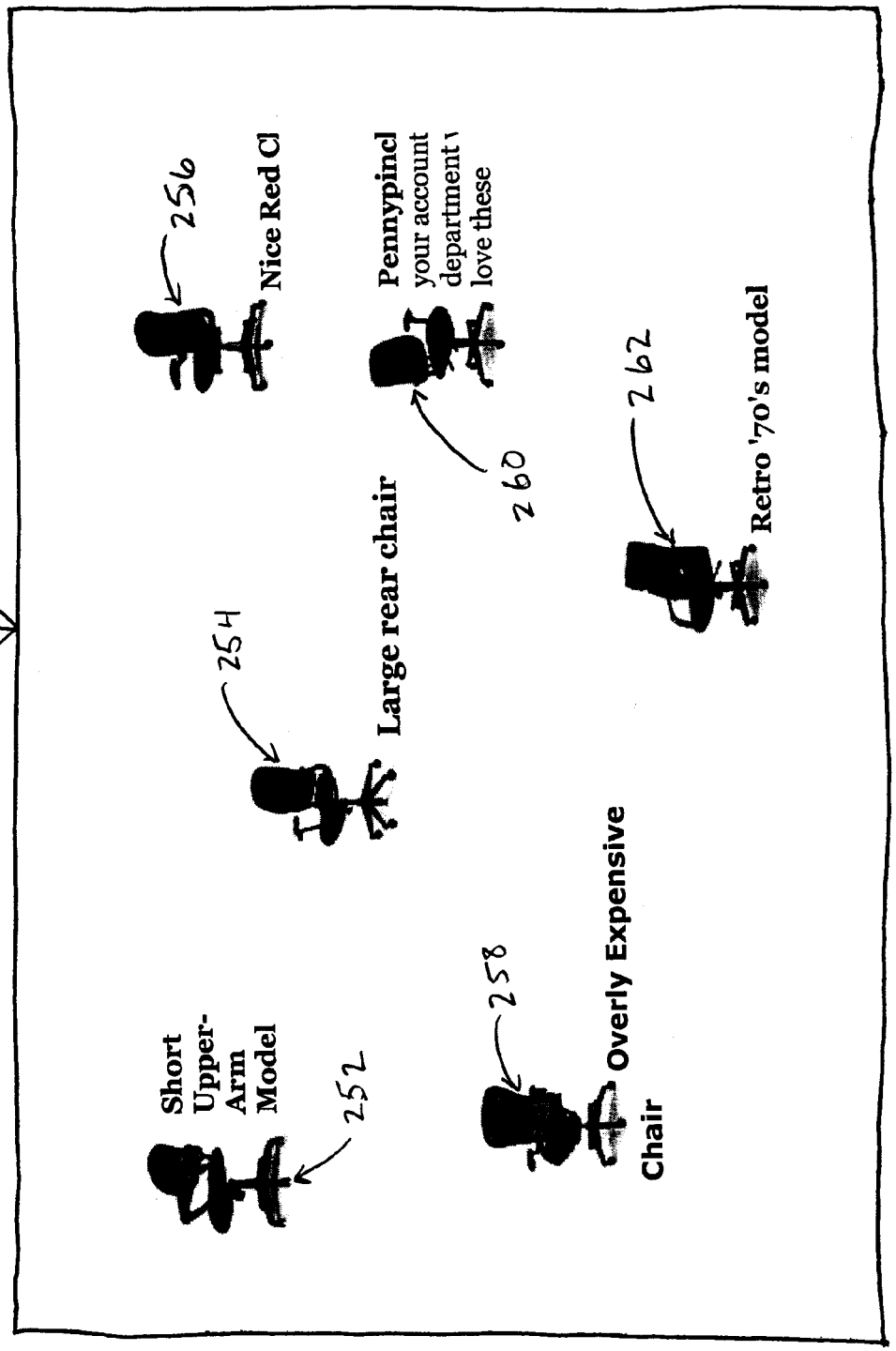
FIG. 2B illustrates an example of an HTML document that includes a plurality of chair objects.

Alternatively, or in addition, Web sites may also be created that include 3D objects that represent a particular company's product line. For example, FIG. 2B illustrates an HTML document 250 that includes a plurality of chair objects 252–262. Unlike the chip 202, chair objects 252–262 are generated from data stored as geometrical information, the same type of information that is used to represent 3D objects within a design layout. In one embodiment, a design program, such a 3D Studio VIZ™ is used to generate the object geometry files that contain the geometrical information. For example, object geometry files may be created using a variety of different formats, such as the .MAX and .DWG file formats that are typically produced by the design program 3D Studio VIZ™.

In one embodiment, the HTML documents that include tags to files containing geometrical information about 3D objects also include data that indicates that those tags are to object-defining data. For example, a tag may be identified as a tag to object-defining data by storing an particular identifier (e.g. 1234) with the tag. An identifier that indicates that a tag is to object defining-data is referred to herein as an "object-definition identifier". Tags that are thus identified are referred to herein as "object-definition tags".

When an HTML document is being decoded at a client, the browser reads the tags contained therein. The tag identifier associated with the object-definition tags for 3D objects indicates to the asset integration mechanism on the client that the tags correspond to 3D objects, and that thumbnail images are to be generated for the 3D objects.

Figure 3A:
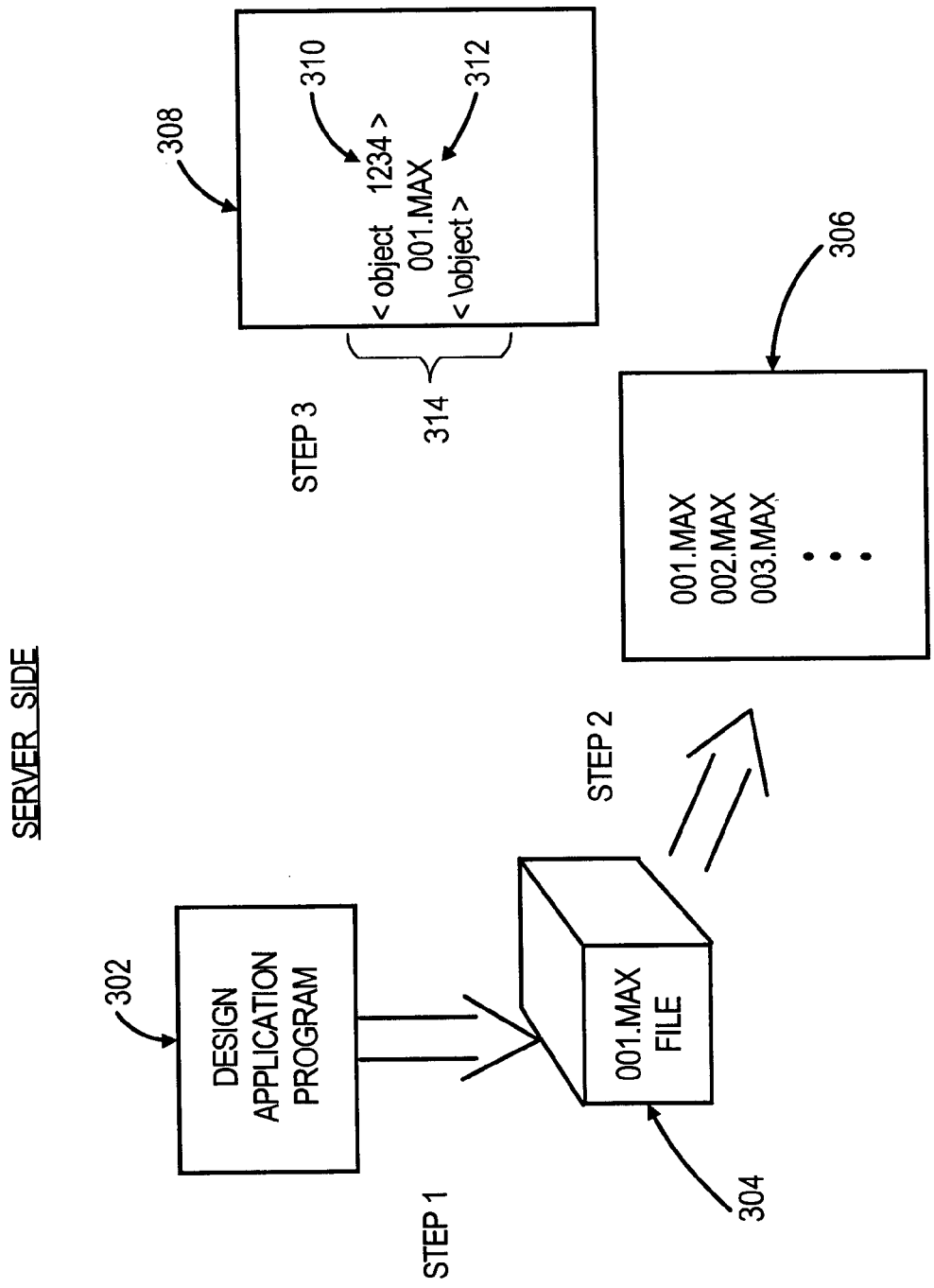
FIG. 3A illustrates a sequence of steps for including a geometrical object within an HTML document.

For example, FIG. 3A illustrates a sequence of steps for including a geometrical object within an HTML document according to certain embodiments of the invention. At step 1, a design application program 302 is used to generate the geometrical information for an object, and to store the information into a .MAX file 304. For example, a design application such as design application program 302 can be used to create a .MAX file ("001.MAX" file) that contains geometrical information describing the geometry of a particular object.

At step 2, the .MAX file 304 ("001.MAX" file) is stored to disk 306 so as to allow the information to be retrieved in response to a browser request. At step 3, an HTML document 308 is generated which includes a tag 314. As depicted, tag 314 includes an object-definition identifier 310 ("1234") and a reference 312 to .MAX file 304 ("001.MAX" file). The object-definition identifier 310 indicates that tag 314 is associated with a file that contains geometrical information. As will be described in detail below, when browser application 114 requests the contents of HTML document 308, the object-definition identifier 310 informs browser application 114 that tag 314 is an object-definition tags, that the file associated with tag 314 contains geometrical information, and that a thumbnail of the object defined in the .MAX file 304 is to be generated.

Integrating Content into a Design Application

Figure 4:
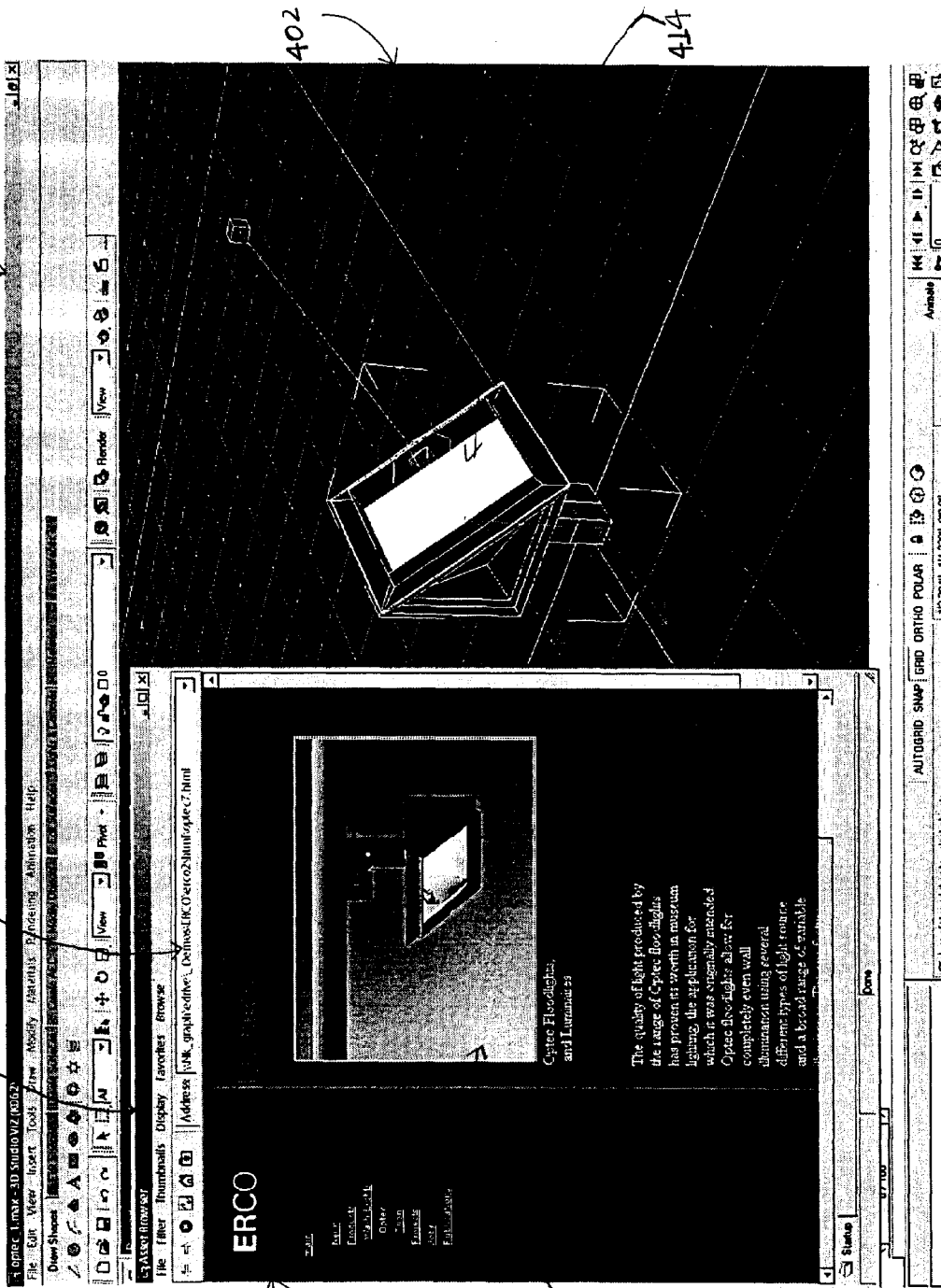
FIG. 4 illustrates an example of a view that may be displayed at client.

FIG. 4 shows a view 400 that may be displayed at client 102 according to certain embodiments of the invention. In this example, view 400 includes a design window 406 and a browser window 404. In one embodiment, design window 406 is generated and displayed at client 102 in response to a user executing design application program 112. Included within design window 406 is a design layout region 402 in which scenes may be created.

By interacting with controls provided by design window 406, a user can initiate or execute browser application 114 to cause browser window 404 to be displayed within view 400. In one embodiment, browser window 404 resembles a typical window that is displayed on a client in response to a user executing a browser application such as Microsoft Internet Explorer® or Netscape Navigator®. However, unlike the typical browser applications, when an HTML document that includes an object-definition tags is decoded, browser application 114 requests that only a portion of the geometrical information of the object associated with the object-definition tags be sent back to the client 102.

Figure 5A:
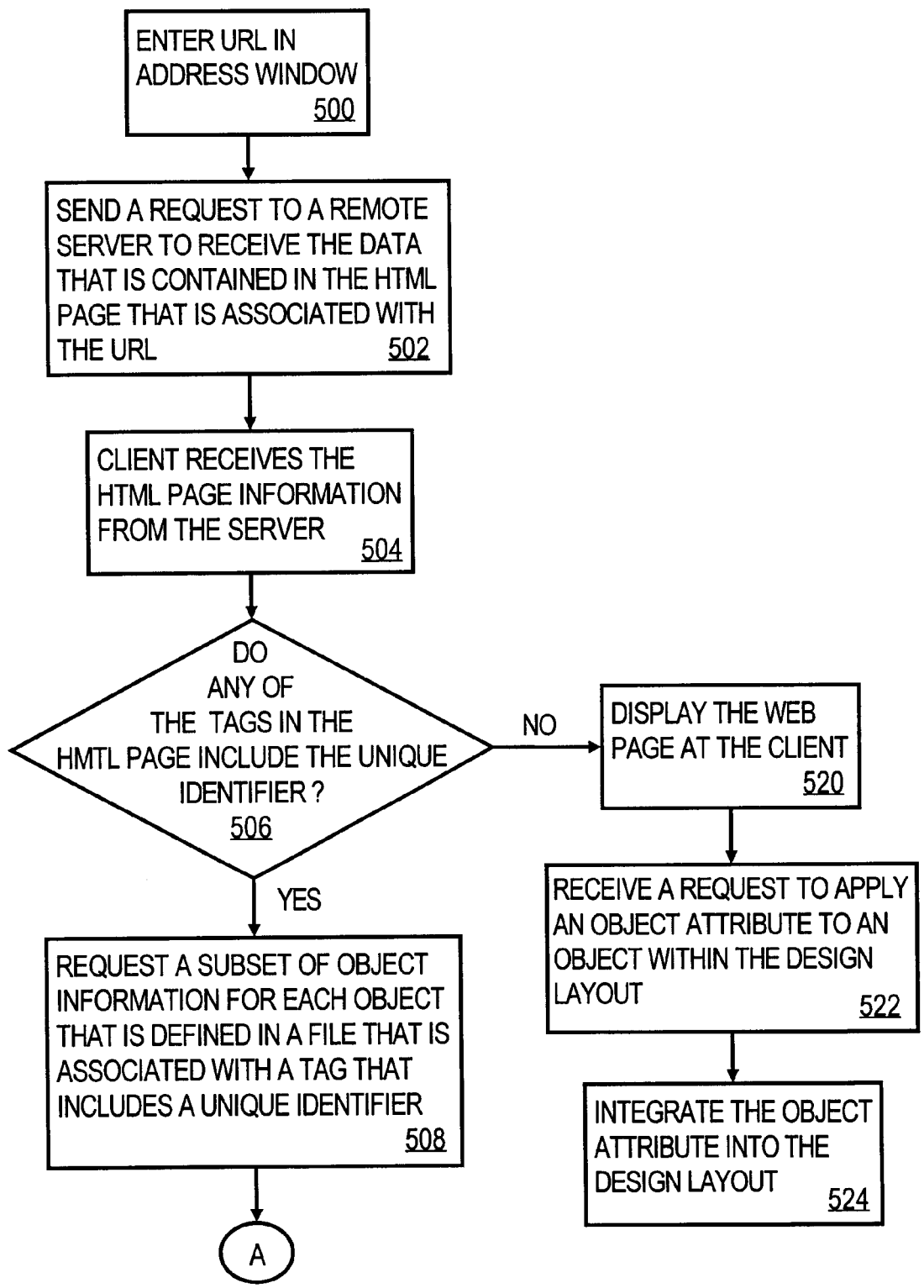
FIG. 5A is a flow diagram depicting a sequence of steps for integrating objects or object attributes into a design layout.
Figure 5B:
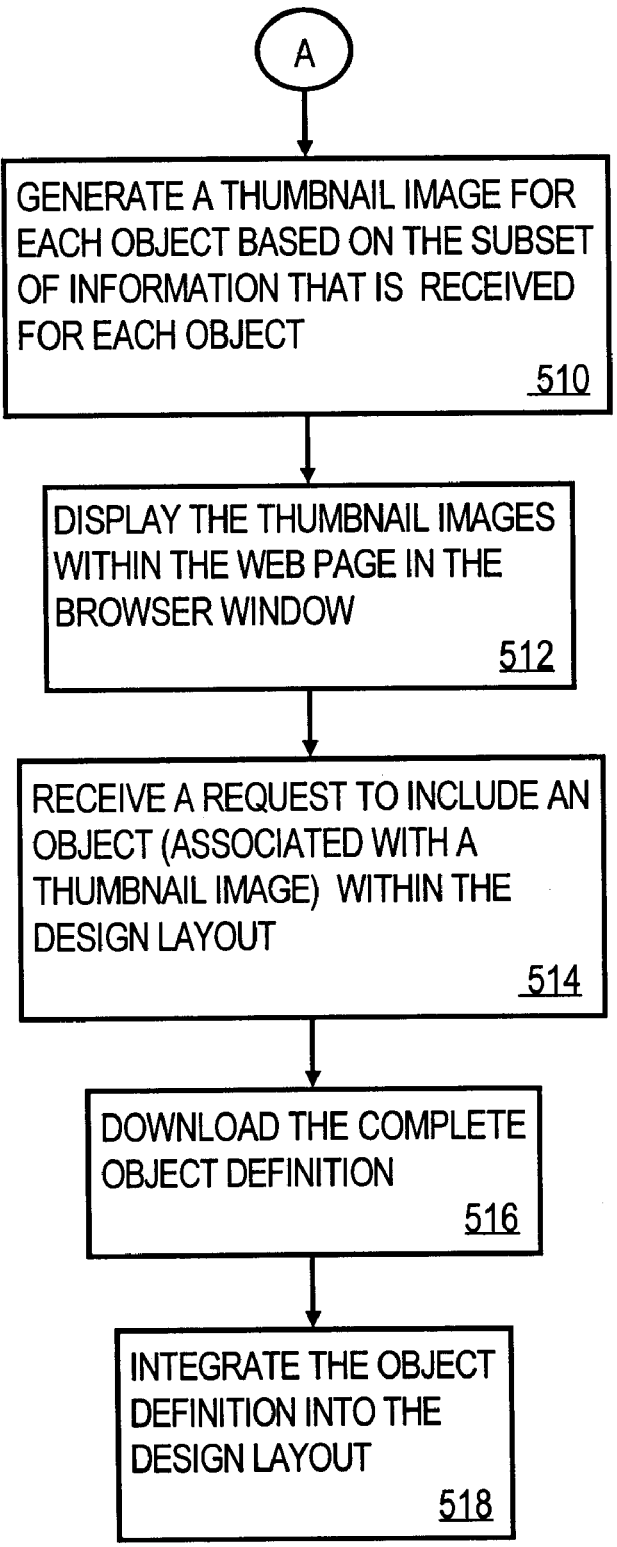
FIG. 5B is a flow diagram depicting a further sequence of steps for integrating objects or object attributes into a design layout.

For example, FIG. 5A and FIG. 5B are a flow diagram depicting a sequence of steps for integrating objects or object attributes into a design layout. For explanation purposes, the steps of FIG. 5A and FIG. 5B are described in reference to the components depicted in FIG. 1 and FIG. 4. Also for explanation purposes, it shall be assumed that content file 126 corresponds to a ".MAX" file that contains geometry information for the light fixture object 414 depicted in design layout region 402 and that content file 128 corresponds to a ".GIF" file that contains bitmap information for chip 202 depicted in HTML document 200. It should be noted that the .MAX and .GIF formats are used for explanation purposes only and that embodiments of the invention are not limited to any particular file formats.

At step 500, a URL is entered into an address window 408 of browser window 404. The URL may be entered using the typical methods that are used to enter URLs in a browser application such as Microsoft Internet Explorer® or Netscape Navigator®. For example, a user may cause a particular URL address to be entered into address window 408 by actually typing in the address or by selecting a link that has been previously stored under the "Favorites" pull-down menu.

At step 502, browser application 114 sends a request to a remote server to receive data that is contained in an HTML document that is associated with the URL. For example, assuming that server 106 contains the HTML associated with the URL, in response to entering the URL into address window 408, browser application 114 sends a browser request to server 106.

At step 504, in response to receiving the request, remote server 106 returns the corresponding HTML document to client 102.

At step 506, browser application 114 determines whether the HTML document contains any tags that include the object-definition identifier. If the HTML document does not contain any tags that include the object-definition identifier, then the process proceeds to step 520.

Alternatively, if the HTML document does contain one or more tags that include the object-definition identifier, then at step 508, for each tag that includes the unique identifier, the browser application 114 retrieves a subset of the object information that is contained in each file that is referenced by the tag. For example, assuming that content file 126 includes geometry information about a light fixture object, if the HTML document contains a tag that includes the object-definition identifier and a reference to content file 126, then browser application 114 requests server 106 to return a subset of the object information contained in content file 126. Thus, instead of downloading the entire geometric file, which could consist of several megabytes of data and take a significant amount of time to download, browser application 114 retrieves only a portion of the data that is needed for generating a thumbnail image.

At step 510, browser application 114 generates a thumbnail image for each object in which a subset of the object's information is retrieved. For example, browser application 114 generates thumbnail image 412 based on the subset of information that is received from content file 126.

In one embodiment, the thumbnail images, along with information that identifies the source of the thumbnail images (i.e. the actual content file), are saved in nonvolatile memory as a "smart" object. As will be described in detail below, these smart objects may be used to organize and manage, on the client-side, content that is contained on the remote web sites.

In one embodiment, the file extension of a content file is used to determine the actual format of the object information. For example, a content file having a .MAX extension indicates that the content file contains data in the native 3D Studio VIZ™ MAX format while a content file having a .DWG extension indicates that the content file contains data in the AUTOCAD DWG format. Thus, embodiments of the invention are not limited to any particular file format.

At step 512, browser application 114 causes the thumbnail images to be displayed as part of the HTML document within the browser window. For example, after generating thumbnail image 412, browser application 114 causes thumbnail image 412 to be included in HTML document 410 when rendered within browser window 404. In certain embodiments, the thumbnail images are generated as "smart" objects that include a link to the object's corresponding underlying geometric file. The use of smart object is described in further detail below.

At step 514, a request is received by browser application 114 to integrate into the scene contained in design layout region 402 an object that is represented as a thumbnail image within HTML document 410. Various techniques may be used to indicate that an object represented as a thumbnail image is to be integrated into a design layout. For example, in one embodiment, a user may drag and drop the thumbnail image 412 from HTML document 410 into design layout region 402. Alternatively, a user may integrate an object into a design layout through the use of a menu option or by pointing to and selecting the thumbnail image using a pointing device such as a mouse. Thus, embodiments of the invention are not limited to any particular technique for indicating that an object represented as a thumbnail image is to be integrated into a design layout.

At step 516, the browser application 114 communicates with the remote server to retrieve the complete object definition. For example, in response to receiving a request to integrate the light fixture object (depicted in thumbnail image 412) into design layout region 402, the browser application 114 retrieves the entire content file 126 from server 106 in order to obtain the complete geometric information for the light fixture object.

At step 518, design application 112 integrates the object into the design layout by creating an object in the scene based on the downloaded object information. For example, by dragging and dropping thumbnail image 412 into design layout region 402, light fixture object 414 is automatically integrated into design layout region 402. Once the light fixture object 414 is integrated into design layout region 402, a user may modify and manipulate the object in the same manner as any other object that is created through the use of the design application program 112. In one embodiment, to integrate an object into a design layout, the asset integration mechanism determines how the geometric information can be meaningfully inserted into the design application, and then instantiates an equivalent object either by linking, importing or Xreferencing the object into the design layout. Xreferencing provides for the linking of files (i.e., one file includes a reference to another file) which can be used to reduce the amount of data that needs to be stored in a single file.

In certain embodiments, when a thumbnail image is brought into a design layout, instead of retrieving the object definition, the browser application retrieves a URL that is associated with an XML document. The browser application then downloads the XML document, parses the XML document, and retrieves the files that are associated with the XML document. The files retrieved may correspond to an object definitions or other XML files. In certain embodiments, clients are configured with an XML parser to provide for the managing and parsing of XML documents.

In one embodiment, the XML documents may include references to multiple object definition file formats. The design application program can then select from different file formats to download the object definition file that corresponds to the particular format that is required by the design application. For example, if an XML document includes a reference to two chair object definition files, one in .MAX format and the other in .DWG format, then a design program such as 3D Studio VIZ™ can choose the object definition file that is of the .MAX format, while an AUTOCAD program can choose the object definition file that is of the .DWG format.

At step 520, browser application 114 retrieves any data that is associated with any referenced links and causes the HTML document to be rendered as an HTML document within browser window 404. For example, assuming that the URL corresponds to HTML document 200, browser application 114 retrieves content file 128 from server 106 and displays it as chip 202 as illustrated in HTML document 200.

In one embodiment, the raster images are saved to nonvolatile memory so that they may be organized and managed through the design application program 112.

At step 522, the user may initiate a request to browser application 114 to apply an object attribute to an object that is contained within the HTML document 202. Various techniques may be used to indicate that an object attribute is to be applied to an object within a design layout. For example, in one embodiment, a user may drag and drop the chip 202 from HTML document 202 onto an object that is contained in design layout region 402. Alternatively, a user may apply an object attribute to an object by interacting with certain predefined menu options. Thus, embodiments of the invention are not limited to any particular technique for applying an object attribute to a particular object that is contained within the design layout.

At step 524 the object attribute is integrated into the design layout by applying the raster image information to a selected object in the scene.

It should be noted that, for explanation purposes only, examples are given in which HTML documents contain either only raster image files (object attributes) or only geometric information files (objects). However, embodiments of the invention are not limited to the use of HTML documents that contain only raster image files (object attributes) or only geometric information files (objects). Thus, the steps described in FIGS. 5A and 5B are clearly for explanation purposes only and should not be construed as being limited to any particular example or step that has been described.

Managing and Organizing Content

The asset integration mechanism allows content to be managed transparently without regard as to where the actual underlying files are located. In one embodiment, in creating thumbnail images that are based on geometric files located on remote servers, the asset integration mechanism generates a "smart" object for each data file. These smart objects, in addition to the thumbnail image information, contain the URL that indicates where the actual geometric file is located on the network. By maintaining a link (i.e. URL) between the thumbnail image and the location of the corresponding geometric file, when a thumbnail image that is stored on the client is dragged and dropped into a design layout, the asset integration mechanism can automatically retrieve the geometrical information from the remote server and integrate the object into the design layout. Thus, a user may have access to thousands of images without actually having to store their geometric information on a client.

Figure 6:
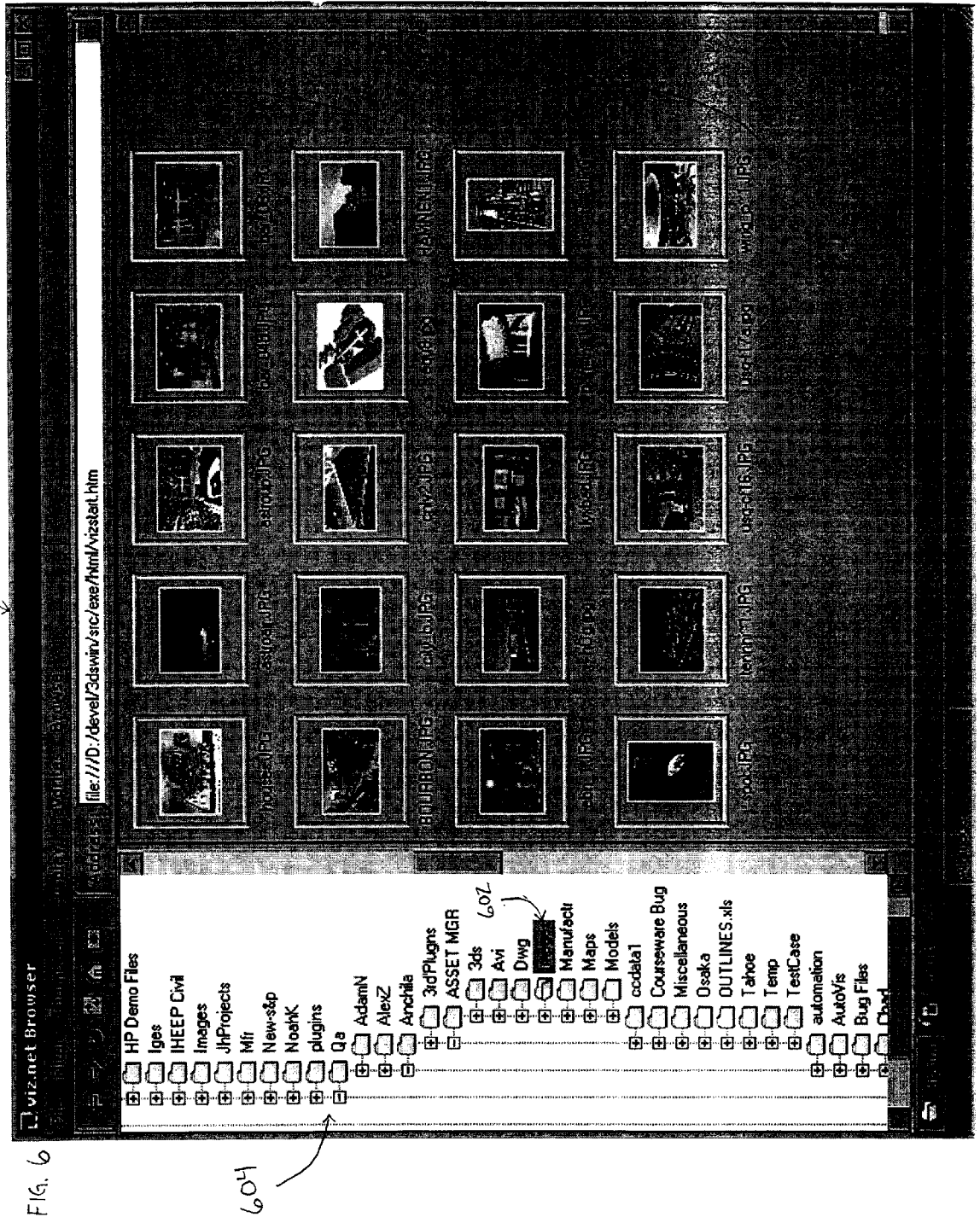
FIG. 6 illustrates a window that includes a plurality of thumbnail images that have been stored by a client.

FIG. 6 illustrates a window 600 that includes a plurality of thumbnail images 606 that have been stored by a client. These thumbnail images 606 were generated based on geometrical data stored in files that are located on one or more remote servers. For example, thumbnail images 606 may reside in nonvolatile memory on client 102 and may graphically depict content that is based geometrical data from files that are associated with remote servers 106, 108 and 110.

In one embodiment, the asset integration mechanism provides a directory structure tool that allows users to maintain, organize, and view content in a structured format. This tool allows users to easily locate the assets that are of interest to them and to quickly and seamlessly integrate those objects into their design layout. For example, as depicted in window 604, a "hierarchical directory structure"-type tool is provided that allows users to maintain and organize their content as they see fit. In this example, thumbnail images 606 are maintained within a "Images" folder 602. Although not shown, window 600 may be just one of several windows that are being displayed at client 102. For example, design window 406 and browser window 404 may also be concurrently displayed at client 102. This allows users to view thumbnail images of the different objects that are available and to integrate any of these objects into a design layout simply by dragging and dropping a thumbnail image from window 600 into design window 406.

In certain embodiments, instead of displaying either a file name or generic file image for each raster image file (object attribute) that is contained within a folder, the asset integration mechanism automatically creates a thumbnail image that graphically depicts the information that is contained in raster image file. For example, assuming that a folder includes the files chip001.GIF; chip002.GIF; chip003.GIF; chip004.GIF; and chip005.GIF; instead of displaying their non-descriptive file names, in certain embodiments the asset integration mechanism generates corresponding thumbnail images for each file and displays them within a window to the user. Thus, the user is presented with a clearer indication of the object attributes that are actually available to them. The user may integrate the object attributes into a design by dragging and dropping them into a design layout.

In one embodiment, a spider content tool is provided that automatically searches for content that is available on the network. In one embodiment, a user may provide a domain name or address of one or more remote servers that are to be searched for content. In certain embodiments, in response to locating a file that contain geometric information, the spider content tool automatically generates a thumbnail image and stores it with a directory or folder within the client. For example, using the spider tool a user may request that the URL "http://www.companyX.com" be search for content. In response to receiving the request, the spider content tool searches the HTML documents that are associated with the URL to identify content. In one embodiment, when the spider content tool identifies a raster image file it automatically downloads the file onto the client. Alternatively, when the spider content tool identifies a geometric file it automatically generates a thumbnail image (smart object) which is then stored onto the client.

Links to Remote Servers

In certain embodiments, the asset integration mechanism provides one or more content buttons or tabs that link to specific HTML documents that are available through the network system. By selecting a specific content button, the browser application 114 automatically connects to the referenced site. In this manner, manufacturers may create content within a directory structure on a remote server and provide a link (URL) that can be included as a content button within the browser application display window. These content buttons themselves may include the names of the different manufactures for which their HTML documents are linked.

The browser application 114 may also provide a "Favorites" pull-down menu for storing links to selected Web sites. In certain embodiments, an update site is maintained that includes a list of links (URLs) that correspond to network addresses where content can be found. In one embodiment, by connecting to the update site, a user has the option of updating their content buttons and/or Favorites pull-down menu by selecting an update option that is provided by the browser application 114. In response to selecting the update option, the users content buttons and/or Favorites pull-down menu is automatically updated to include some or all of the buttons/links that are provided by the update site. As such, a mechanism is provided that allows users to maintain up-to-date links and to locate newly generated content that is available over the network system.

Hardware Overview

Figure 7:
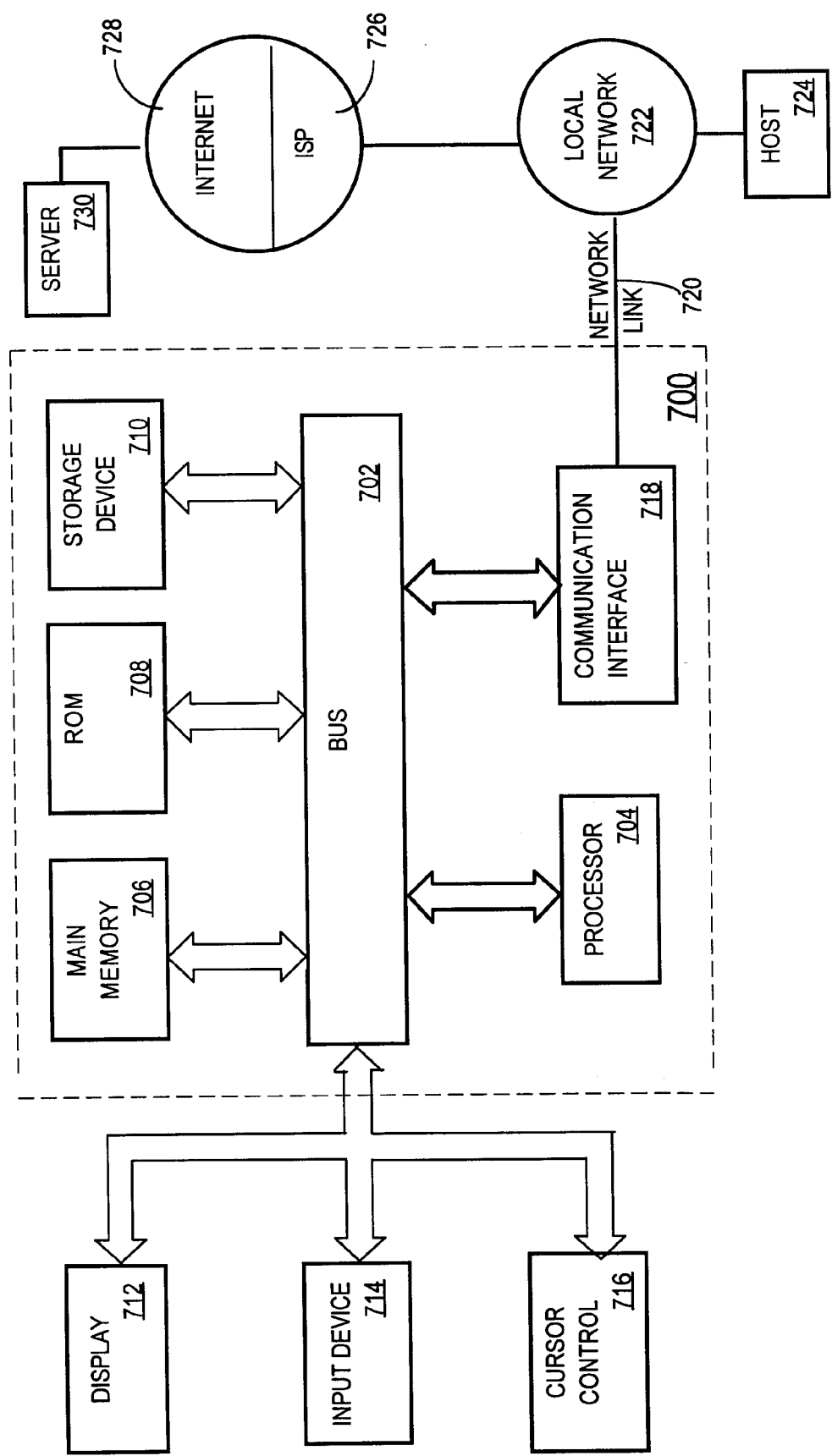
FIG. 7 is a block diagram of a computer system hardware arrangement that can be used to implement the invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for managing, integrating and organizing content that is provided over a network system. According to one embodiment of the invention, the managing, integrating and organizing of content is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for managing, integrating and organizing content as described herein.

The received code may be executed by processor 704 as it is received, and/or stored in storage device 710, or other non-volatile storage for later execution. In this manner, computer system 700 may obtain application code in the form of a carrier wave.

Alternatives and Extensions

The asset integration mechanism described herein provides a tool for managing, integrating and organizing content. In particular, the asset integration mechanism provides transparent access to content regardless of where it is physically located. Thus, the content data may be local to the user's client machine or maintained on a remote server, such as a FTP server, Web server, Gopher server, or any other server type that is accessible by the user's client.

In addition, although generally described in a Web environment, the asset integration mechanism can also be used on any network in which content data is stored on a server that is separate from the client. Thus, embodiments of the invention may include content that is accessible to a client over a variety of different types of network systems, including but not limited to, Local Area Networks (LANs), Wide Area Network (WANs), proprietary networks, the Internet or any other communication medium that will allow two computers to communicate. Furthermore, embodiments of the invention may be practiced using a variety of different communication protocols, including but not limited to HTTP, TCP/IP, or any other communication protocol that can be used to communicate over a network.

In describing certain embodiments of the invention, several drawing figures have been used for explanation purposes. However, the invention is not limited to any particular context as shown in drawing figures, and the spirit and scope of the invention include other contexts and applications in which the linking mechanism described herein is available to other mechanisms, methods, programs, and processes. For example, although remote servers 106, 108 and 110 have been described in terms of Web servers, embodiments of the invention are not limited to any particular type of remote servers or any particular type of communication protocol for interfacing between a client and a remote server. In addition, although examples have been described in terms of the objects and object attributes being remotely located to the client, in certain embodiments, the objects and/or object attributes may actually be retrieved from transport media that is associated with the client. For example, a CD-ROM may include HTML page information that reference objects and/or object attributes that are also contained the CD-ROM or other transport media associated with the client. Thus, the mechanisms previously described for integrating an object into a scene, applying attributes to an object and managing objects at a client can also be applied to objects and/or object attributes that are contained on transport media that is associated with the client.

Thus, although specific details have been provided for explanation purposes, the invention should not be construed as being limited to any particular example or step that has been described. For example, although examples have been described in reference to static HTML documents, embodiments of the invention are not limited to any particular method for providing content to a user's client machine. For example, HTML document 308 in FIG. 3A may instead be dynamically generated in response to receiving a request from a client.

Also, in the foregoing specification, the invention has been described with reference to specific embodiments thereof. It will, however, be evident that various modifications and changes may be made thereto without departing from the broader spirit and scope of the invention.

For example, although examples have been provided with respect to HTML documents, embodiments of the invention are not limited to any particular type of communication protocol or electronic document format. For example, embodiments of the invention may be practiced using a variety of different communication mechanisms and protocols, which may include, but is not limited to TCP/IP, HTTP, FTP and a variety of other types of standardized and propriety forms of communication protocols.

Also, the specification and drawings are, accordingly, to be regarded in an illustrative rather than a restrictive sense. For example, instead of generating the thumbnail images from portions of the content files, in certain embodiments, thumbnail images are actually located at the remote servers. For example, FIG. 3B illustrates a sequence of steps for including a thumbnail image and geometrical object within an HTML document according to certain embodiments of the invention. In this example, at step 1, a design application program 352 is used to generate both the geometrical information for an object within a .MAX file 304 and a thumbnail image of the object within a .JPG file 354. At step 2, the .MAX file 304 ("001.MAX" file) and JPG file 354 are stored to disk 306 so as to allow the information to be retrieved in response to a browser request. At step 3, an HTML document 358 is generated which includes a tag 314. As depicted, tag 314 includes an object-definition identifier 310 ("1234"), a reference 312 to .MAX file 304 ("001.MAX" file), and a reference 360 to .JPG file 354 ("THUMBNAIL001.JPG" file). The object-definition identifier 310 indicates that tag 314 is associated with a file that contains geometrical information. When browser application 114 requests the contents of HTML document 358, the object-definition identifier 310 informs browser application 114 that the file associated with tag 314 contains geometrical information and that the thumbnail image in reference 360 is to be retrieved and displayed at client 102.

In one embodiment, the dragging and dropping of geometric information is implemented through the use of ActiveX control objects that may be embedded within a Web page. For example, the ActiveX control can enable a client application to participate in web or internet drag and drop. Web drag and drop is the capability to drag content from a web browser rendered HTML page and drop it into another application. If embedded into any HTML page, the control enables remote data files to be dropped into any application that participates in Windows-standard drag and drop. The control encapsulates two logical ideas: a data source and a presentation.

The data source is the data the control represents or is a proxy for. It is the data source that the client application (typically a 3D Studio VIZ or AutoCAD, etc.) requires. Since the data source is typically large in size, it is generally impractical to display it directly on the web page. Instead, the control acts as a proxy for the data source and maintains a reference to the remote data file.

The presentation is what the control displays on the web page as a proxy for the data source. The control will render a raster image when asked by the web browser. This image may be provided to the control as a parameter in the form of an <alt> tag or can be extracted from the data source if necessary. When a user drags the control from a web page, the presentation (i.e. the raster image) implies what will happen when dropped. For example, if the presentation image were a picture of a chair, the chair would be added to the scene if the control were to be dropped into a supporting design application.

When dropped into an application that participates in drag and drop, the control may respond in a couple of ways. For example, when dropped into an application, the control may transfer to the target application a uniform resource locator (URL) to the data source. It is then up to the client application to connect to the given URL, download the data source, and proceed as necessary. Alternatively, the control itself may initiate a data transfer of the data source to the client application.

For explanation purposes only, examples have been provided in which the content consists of static bitmaps that downloaded to asset integration mechanism. However, embodiments of the invention are not limited to any particular type of content. For example, the content may consist of any "light-weight" static or interactive representation that may be download and/or received by the asset integration mechanism. These "light-weight" representations include a smaller amount of data than is generally required to represent the corresponding 3-D object. For example, embodiments of the invention may include lightweight interactive content, such as objects based on MetaStream™ 3-D file format that was co-developed by MetaCreations, Corp. and Intel, Corp.

Also, in certain embodiments, the retrieved thumbnail images may be smart objects that include both a thumbnail description and a link to the address (URL) of where its corresponding object file is located.

In another embodiment, reference 360 represents a reference to a bitmap image file that graphically depicts the features of the contents of .MAX file 304. In one embodiment, the bitmap image file is not generated based on the contents of .MAX file 304 but instead is a separate image file that was generated independent of contents of .MAX file 304. For example, the bitmap image may be based on a photograph that was taken of the actual chair that is depicted by chair object 252 in FIG. 2B. In one embodiment, a flag is provided which signals the browser application 114 that, in response to a user selecting the bitmap image for entry into a scene that, the contents of .MAX file 304, and not the bitmap image file, is to be retrieved an integrated into the design application program.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for integrating an object into a scene at a client, wherein the object is defined by a set of data, the method comprising performing the following steps at said client:

displaying the scene in a first display region of a display device;

displaying a selectable item in a second display region of said display device, wherein said selectable item corresponds to said object but is generated based on less data than said set of data;

receiving user input that selects the selectable item displayed within the second display region for incorporation into said scene; and in response to receiving said user input, performing the steps of retrieving said set of data, generating said object on said client based on said set of data, and displaying said object in said scene in said first display region of said display device, wherein the object is defined by a set of data located remote to the client; and the step of retrieving said set of data comprises the step of receiving said set of data over a network.

2. The method of claim 1 wherein said selectable item is an image that is generated based on a subset of said set of data.

3. The method of claim 2 further comprising retrieving said subset of said set of data over a network.

4. The method of claim 2 wherein:

the method includes the steps of decoding an HTML document in a browser at said client, wherein said second display region is a window associated with said browser, and detecting a tag for said object in said HTML document;

wherein the step of retrieving a subset of said set of data is performed in response to detecting said tag; and wherein the step of displaying an image based on said subset of said set of data is performed by displaying said image as part of said HTML document.

5. The method of claim 1 wherein said selectable item is a smart object stored at said client, wherein said smart object is an entity that maintains address information that indicates a location of said set of data.

6. The method of claim 2, wherein said image is a thumbnail of said object.

7. The method of claim 2 wherein:

the method includes the steps of decoding an HTML document in a browser at said client, wherein said second display region is a window associated with said browser, and detecting a tag for said object in said HTML document;

wherein the step of retrieving a subset of said set of data is performed in response to detecting said tag; and wherein the step of displaying an image based on said subset of said set of data is performed by displaying said image as part of said HTML document.

8. The method of claim 7 further comprising the steps of:

detecting an object-definition identifier associated with said tag; and based on detecting said object-definition identifier, determining that said tag is for an object for which only a subset of data should be retrieved.

9. The method of claim 7 wherein the step of retrieving said subset of said data comprises the steps of after detecting the tag for said object in said HTML document, causing said subset of data for said selectable item to be dynamically generated based on said set of data.

10. The method of claim 7 wherein:
   the step of retrieving said subset of said data comprises the steps of retrieving image data that was generated prior to detecting the tag for said object in said HTML document; and
   the step of displaying an image based on said subset of said set of data comprises the step of displaying an image based on said image data as part of said HTML document.

11. The method of claim 1 wherein the step of receiving user input that selects the image displayed within the second display region comprises the step of receiving input that indicates a drag and drop operation.

12. The method of claim 1 wherein said selectable item is a smart object, wherein said smart object is an entity that maintains network address information that indicates a location of said set of data over a network.

13. The method of claim 1 wherein:
   the object is a three dimensional object; and
   the set of data is geometric data that defines the three dimensional object.

14. The method of claim 1 wherein
   said set of data in contained on a removable computer readable media that resides within said client; and
   said selectable item is generated based on said set of data that is contained on said removable computer readable media.

15. The method of claim 1, wherein the step of retrieving said set of data comprises:
   determining, at the client, a desired format type associated with said set of data to retrieve; and
   retrieving said set of data with said desired format type from a location remote to the client.

16. A computer-readable medium carrying one or more sequences of instructions for integrating an object into a scene at a client, wherein the object is defined by a set of data, wherein execution of the one or more sequences of instructions by one or more processors causes the one or more processors to perform the steps of:
   displaying the scene in a first display region of a display device;
   displaying a selectable item in a second display region of said display device, wherein said selectable item corresponds to said object but is generated based on less data than said set of data;
   receiving user input that selects the selectable item displayed within the second display region for incorporation into said scene; and
   in response to receiving said user input, performing the steps of
   retrieving said set of data,
   generating said object on said client based on said set of data, and
   displaying said object in said scene in said first display region of said display device,
   wherein the object is defined by a set of data located remote to the client; and
   the step of retrieving said set of data comprises the step of receiving said set of data over a network.

17. The computer-readable medium of claim 16 wherein said selectable item is an image that is generated based on a subset of said set of data.

18. The computer-readable medium of claim 17, wherein said image is a thumbnail of said object.

19. The computer-readable medium of claim 17 wherein:
   the computer-readable medium further includes instructions for performing the steps of:
      decoding an HTML document in a browser at said client, wherein said second display region is a window associated with said browser, and
      detecting a tag for said object in said HTML document;
   wherein the step of retrieving a subset of said set of data is performed in response to detecting said tag; and
   wherein the step of displaying an image based on said subset of said set of data is performed by displaying said image as part of said HTML document.

20. The computer-readable medium of claim 19 further comprising instructions for performing the steps of:
   detecting an object-definition identifier associated with said tag; and
   based on detecting said object-definition identifier, determining that said tag is for an object for which only a subset of data should be retrieved.

21. The computer-readable medium of claim 19 wherein the step of retrieving said subset of said data comprises the steps of after detecting the tag for said object in said HTML document, causing said subset of data for said selectable item to be dynamically generated based on said set of data.

22. The computer-readable medium of claim 19 wherein:
   the step of retrieving said subset of said data comprises the steps of retrieving image data that was generated prior to detecting the tag for said object in said HTML document; and
   the step of displaying an image based on said subset of said set of data comprises the step of displaying an image based on said image data as part of said HTML document.

23. The computer-readable medium of claim 17, wherein:
   the computer-readable medium further includes instructions for performing the steps of:
      decoding an HTML document in a browser at said client, wherein said second display region is a window associated with said browser, and
      detecting a tag for said object in said HTML document;
   wherein the step of retrieving a subset of said set of data is performed in response to detecting said tag; and
   wherein the step of displaying an image based on said subset of said set of data is performed by displaying said image as part of said HTML document.

24. The computer-readable medium of claim 17 further comprising instructions for performing the steps of retrieving said subset of said set of data over a network.

25. The computer-readable medium of claim 16 wherein said selectable item is a smart object stored at said client that includes address information that indicates a location of said set of data.

26. The computer-readable medium of claim 16 wherein the step of receiving user input that selects the image displayed within the second display region comprises the step of receiving input that indicates a drag and drop operation.

27. The computer-readable medium of claim 16 wherein said selectable item is a smart object, wherein the smart object is an entity that maintains network address information that indicates a location of said set of data over a network.

28. The computer-readable medium of claim 16 wherein:

the object is a three dimensional object; and the set of data is geometric data that defines the three dimensional object.

29. The computer-readable medium of claim 16 wherein said set of data in contained on a removable computer readable media that resides within said client; and said selectable item is generated based on said set of data that is contained on said removable computer readable media.

30. The computer-readable medium of claim 16, wherein the step of retrieving said set of data comprises:

determining, at the client, a desired format type associated with said set of data to retrieve; and retrieving said set of data with said desired format type from a location remote to the client.

* * * * *